United States Patent [19]
Miller

[11] Patent Number: 5,893,315
[45] Date of Patent: Apr. 13, 1999

[54] NOTCHING APPARATUS AND BLADE FOR TUBE SEVERING MACHINE

[75] Inventor: David William Miller, Nashville, Tenn.

[73] Assignee: L&P Property Management Company, South Gate, Calif.

[21] Appl. No.: 08/871,920

[22] Filed: Jun. 10, 1997

[51] Int. Cl.[6] ...................................................... B26D 1/00
[52] U.S. Cl. .............................. 83/320; 83/385; 83/692; 83/693
[58] Field of Search .............................. 83/54, 300, 310, 83/320, 319, 385, 576, 692, 693, 856, 857, 917; 407/40, 46, 47, 48, 102, 103, 104, 113

[56] References Cited

U.S. PATENT DOCUMENTS

| | | |
|---|---|---|
| 3,924,502 | 12/1975 | Borzym . |
| 3,934,319 | 1/1976 | Schuler . |
| 3,938,415 | 2/1976 | Borzym . |
| 3,958,467 | 5/1976 | Borzym . |
| 4,036,091 | 7/1977 | Borzym . |
| 4,055,100 | 10/1977 | Borzym . |
| 4,108,029 | 8/1978 | Borzym . |
| 4,109,555 | 8/1978 | Borzym . |
| 4,228,706 | 10/1980 | Borzym . |
| 4,294,147 | 10/1981 | Borzym . |
| 4,315,449 | 2/1982 | Borzym . |
| 4,315,706 | 2/1982 | Erkfritz ............................... 407/113 |
| 4,320,996 | 3/1982 | Roos . |
| 4,337,680 | 7/1982 | Borzym . |
| 4,392,644 | 7/1983 | Borzym . |
| 4,437,374 | 3/1984 | Borzym . |
| 4,457,200 | 7/1984 | Borzym . |
| 4,499,803 | 2/1985 | Borzym et al. . |
| 4,525,110 | 6/1985 | Stojanovski ........................... 407/113 |
| 4,557,639 | 12/1985 | Fischer . |
| 4,614,139 | 9/1986 | Borzym . |
| 4,624,168 | 11/1986 | Borzym . |
| 4,646,601 | 3/1987 | Borzym . |
| 4,766,792 | 8/1988 | Borzym et al. . |
| 4,796,498 | 1/1989 | Borzym . |
| 4,872,384 | 10/1989 | Borzym . |
| 4,932,297 | 6/1990 | Borzym et al. . |
| 4,951,538 | 8/1990 | Borzym . |
| 4,964,325 | 10/1990 | Hartmann, Jr. et al. . |
| 4,964,327 | 10/1990 | Nolan et al. . |
| 4,964,328 | 10/1990 | Nolan et al. . |
| 4,993,297 | 2/1991 | Nolan et al. . |
| 4,993,298 | 2/1991 | Chamulak et al. . |
| 5,003,853 | 4/1991 | Borzym et al. . |
| 5,009,140 | 4/1991 | Nolan et al. . |
| 5,088,365 | 2/1992 | Nolan . |
| 5,201,352 | 4/1993 | Hult ........................ 407/113 |
| 5,231,908 | 8/1993 | Skvarce et al. . |
| 5,347,901 | 9/1994 | Borzym . |
| 5,383,381 | 1/1995 | Graham . |
| 5,571,250 | 11/1996 | Stegmaier ........................ 407/113 |

FOREIGN PATENT DOCUMENTS

| | | |
|---|---|---|
| 2628624 | 12/1977 | Germany . |
| 1135944 | 12/1968 | United Kingdom . |

*Primary Examiner*—M. Rachuba
*Attorney, Agent, or Firm*—Wood, Herron & Evans, L.L.P.

[57] ABSTRACT

A notching apparatus to be used in a tube cutting machine comprising a notching arm having a notching blade holder at the end thereof, a clamping plate and a notching blade having an irregularly shaped peripheral edge comprising three recesses and a cutting edge on the inside of each recess. The notching blade holder has two pins extending outwardly thereof for insertion through two of the three recesses of the notching blade in order to hold the notching blade firmly in place. A plurality of fasteners secure the clamping plate to the notching blade holder with the notching blade resting in a cutout portion of the clamping plate and held securely against rotation by the two pins.

16 Claims, 2 Drawing Sheets

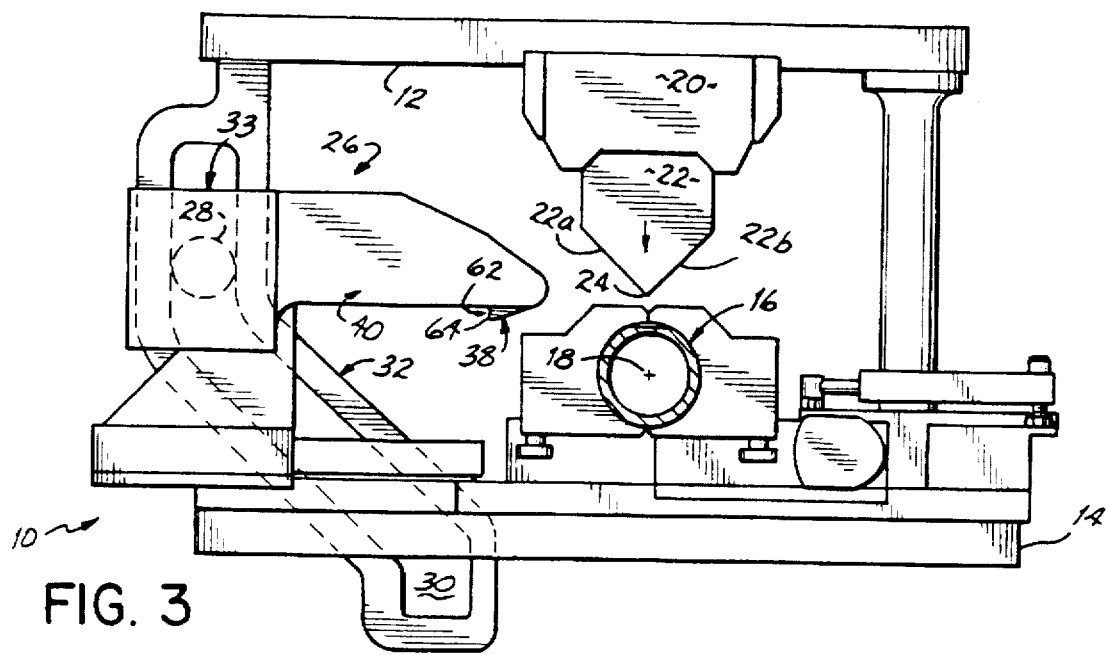
FIG. 3
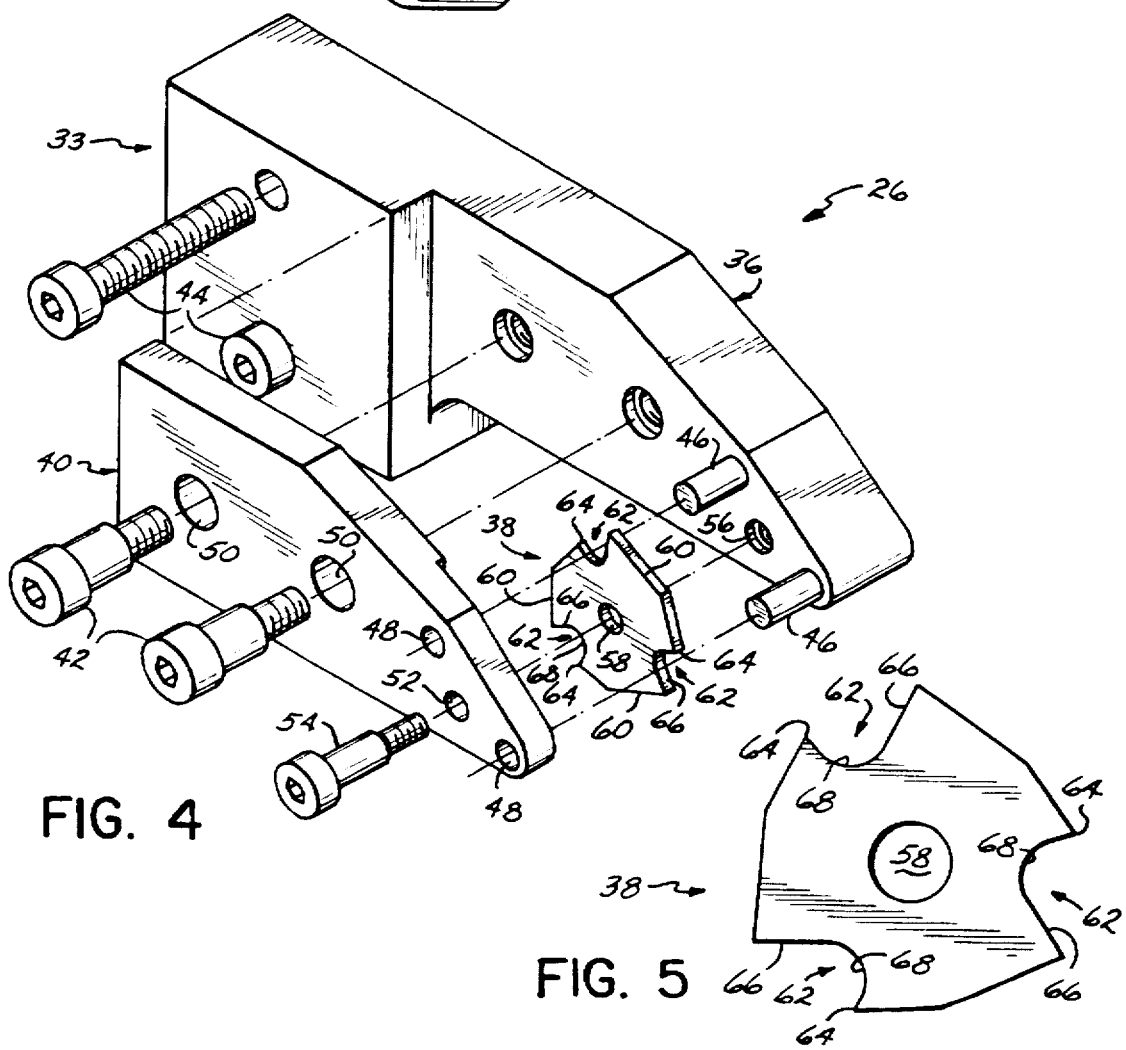
FIG. 4
FIG. 5

NOTCHING APPARATUS AND BLADE FOR TUBE SEVERING MACHINE

FIELD OF THE INVENTION

This invention relates to machinery for severing tubing and, more particularly, to a notching apparatus and notching blade to be used in conjunction with a tube severing machine.

BACKGROUND OF THE INVENTION

Historically, one of the difficulties encountered when severing tubing has been that the severing knife deforms the tube by inwardly deflecting the tube wall at the location of severance. In order to minimize or avoid this dimpling or deformation, tube severing machines have been designed which first notch the tube along a shallow groove in the exterior of the tube wall in a direction transverse to the tube axis just prior to the entry of a severing blade. The severing blade severs the tube wall completely with one powerful downward stroke, the severing blade first contacting the tube in the notched portion of the tube wall. By notching the tube wall before severing the tube wall in a guillotine-type cutting operation, there is less tendency for the tube to be dimpled or disfigured at the location of severance. The notch formed by a notching apparatus in the plane of severance reduces or eliminates the tendency of the tube wall to collapse upon entry of the severing blade. One advantage of this "double-cut operation" involving notching before severing is that no further operations are needed to restore the tube end to a round configuration such as would be necessary if the severance caused deformation of the tube end.

Several patents disclose machines which perform this "double cut operation". Such machines typically comprise a notching apparatus and a severing apparatus. The notching apparatus is often interconnected with an upper platen of a die set by way of a mechanical cam and cam follower such that the descent of the upper platen toward the lower platen causes the notching blade holder to travel in a direction transverse to the tube axis. Both thrust and pull across motions are known. An example of a mechanism which utilizes both the pull across and thrust motions for the notching apparatus us U.S. Pat. No. 4,646,601 which is herein incorporated by reference in its entirety.

Attached to the upper platen of such machines is a severing blade which is fixedly secured to the upper platen and moves vertically downwardly in a swift stroke to sever the tube in the vertical plane in which the tube has been notched. U.S. Pat. Nos. 3,938,415; 4,109,555; 4,108,029; and 5,088,365 all disclose a tube severing apparatus which utilizes this double cut operation.

Various blade configurations have evolved, some of which include hook portions such as is disclosed in U.S. Pat. No. 4,993,298. Other notching blades such as the notching blade disclosed in U.S. Pat. No. 4,796,498 have two cutting points that are staggered one below the other so that as the notching blade comes across the tube, the higher notching point notches a shallow first cut in the tube wall and immediately thereafter a second deeper cutting point notches a deeper cut in the inner tube wall. Other notching blades have multiple cutting surfaces or points so that the same blade may be slightly rotated to present a new cutting area when the first cutting area becomes dull and ineffective. U.S. Pat. No. 4,646,601 discloses such a notching blade which is triangular in configuration and may be rotated 120° in order to present a new cutting surface used to notch the tube prior to severance. Utilizing blades which have multiple cutting edges enables a user to simply loosen the notching blade apparatus and rotate the notching blade so as to expose a new cutting surface or edge rather than replacing a notching blade once it is worn and needs to be replaced. Therefore, a blade with multiple cutting edges which simply may be rotated in order to expose a sharp cutting edge may be used for more repetitions than blades with simply one cutting edge and, thus, reduces the number of blades required for a predetermined number of repetitions. Because the notching blade does not have to be replaced as often, substantial time may be saved increasing the time the machine can be operational, thus increasing production. Substantial time and cost savings are the result.

U.S. Pat. No. 4,646,601 discloses a notching blade having multiple cutting surfaces which is held in place by one screw which passes through the blade and into a recess in a notching blade holder. As the notching operation is repeated over and over again, the notching blade may tend to move slightly, thus adversely effecting the integrity of the notch to be cut in the tube. A notching blade which is not securely held in a fixed position on a notching arm may result in inaccurate non-uniform notches across tubes and the stress caused by the mis-alignment of the notching blade with the notching blade holder may eventually cause the notching blade to shear or break.

Therefore, it has been one objective of the present invention to provide a notching blade holder which is capable of securely fastening an indexable notching blade in the notching blade holder.

It has been a further objective of the present invention to provide an indexable notching blade configured so as to be securely fastenable in a notching blade holder in order to increase the life span of the notching blade.

It has been a further objective of the present invention to provide a uniquely shaped notching blade which is specifically adapted to be mounted in a notching blade holder and secured against movement by a plurality of pins extending outwardly from the notching blade holder.

SUMMARY OF THE INVENTION

The invention of the application which accomplishes these objectives comprises a tube cutting machine having a lower platen assembly, a movable upper platen, a notching apparatus including a notching blade holder specifically adapted to securely hold in place a specially shaped notching blade. The lower platen assembly includes means to secure a tube in a position to be severed such as clamping jaws. A severing blade holder which carries a severing blade is secured to the upper platen. The severing blade holder is movable with the upper platen such that when the upper platen moves downwardly toward the lower platen assembly to sever the tube, the severing blade holder securing the severing blade moves with the upper platen. The width of the severing blade is such that the entire tube is severed as the severing blade passes through the severing plane of the tube. The notching apparatus comprises an arm and means interconnecting the arm with the upper platen to cause the notching arm to move laterally across the tube transverse to the direction of movement of the severing blade as the upper platen descends toward the lower platen assembly. A cam and cam follower mechanism are permanently secured to the upper platen and cause the notching apparatus to be pulled across the tube in order to notch the tube just prior to severance of the tube.

The notching arm of the notching apparatus extends outwardly and terminates in a notching blade holder. The notching blade holder has two pins extending generally perpendicular to the longitudinal dimension of the notching blade holder. The pins assist in holding a uniquely shaped notching blade against rotation while the blade is engaged with an outer side surface of the notching blade holder from which the pins extend. A clamping plate having a cut-out portion configured to receive the notching blade abuts the outer side surface of the notching blade holder, the pins of the notching blade holder passing through aligned holes in the clamping notching blade holder passing through aligned holes in the clamping plate. A plurality of fasteners secure the clamping plate to the notching blade holder with the notching blade being held in place by one of these fasteners. The notching blade rests in the cut-out portion of the clamping plate between the clamping plate and the notching blade holder.

The notching blade of the present invention has a centrally located hole therethrough and a generally triangular shaped peripheral edge having three equidistantly spaced recesses therein. Three cutting edges or surfaces, one adjacent each recess, lie along the peripheral edge of the blade. Each cutting edge enables the notching blade to notch a metal tube as the notching blade is pulled across the tube in a direction generally transverse to the longitudinal axis of the tube. When one of the three cutting edges is dulled by repeated use, the notching blade need not be replaced but need only be rotated so as to expose one of the other two cutting edges to the tubes to be cut. When this second cutting edge is dulled over a period of time, a third cutting edge is exposed and used and when it is dulled, the blade is replaced. However, the number of repetitions that such a blade having three equally effective cutting edges or surfaces may perform is substantially higher than a blade having merely one cutting edge.

The two pins protruding from the notching blade holder pass through two of the three recesses in the notching blade and also through two corresponding holes in the clamping plate in order to firmly secure the notching blade between the notching blade holder and the clamping plate and prevent any rotation of the notching blade. The third recess, i.e. the one without a pin passing therethrough, is the recess having the adjacent cutting edge exposed or activated. When one desires to change cutting edges of a notching blade or replace the notching blade entirely, one merely removes the fasteners causing the clamping plate to be able to be pulled away from the notching blade holder thus exposing the notching blade. The notching blade may then be pulled away from the two pins and rotated to expose a different cutting edge or the notching blade may be replaced entirely.

These and other objects and advantages of this invention will be apparent from the following description of the drawings.

BRIEF DESCRIPTION OF THE DRAWINGS

FIG. 3 is a simplified front elevational view of the tube cutting apparatus of FIG. 1 with the notching apparatus at its furthest left position just prior to the severing of the tube; and FIG. 4 is an exploded perspective view of the notching apparatus of the present invention;

FIG. 5 is an enlarged elevational view of the notching blade illustrated in FIG. 4.

DETAILED DESCRIPTION OF THE PREFERRED EMBODIMENT

Figure 1:
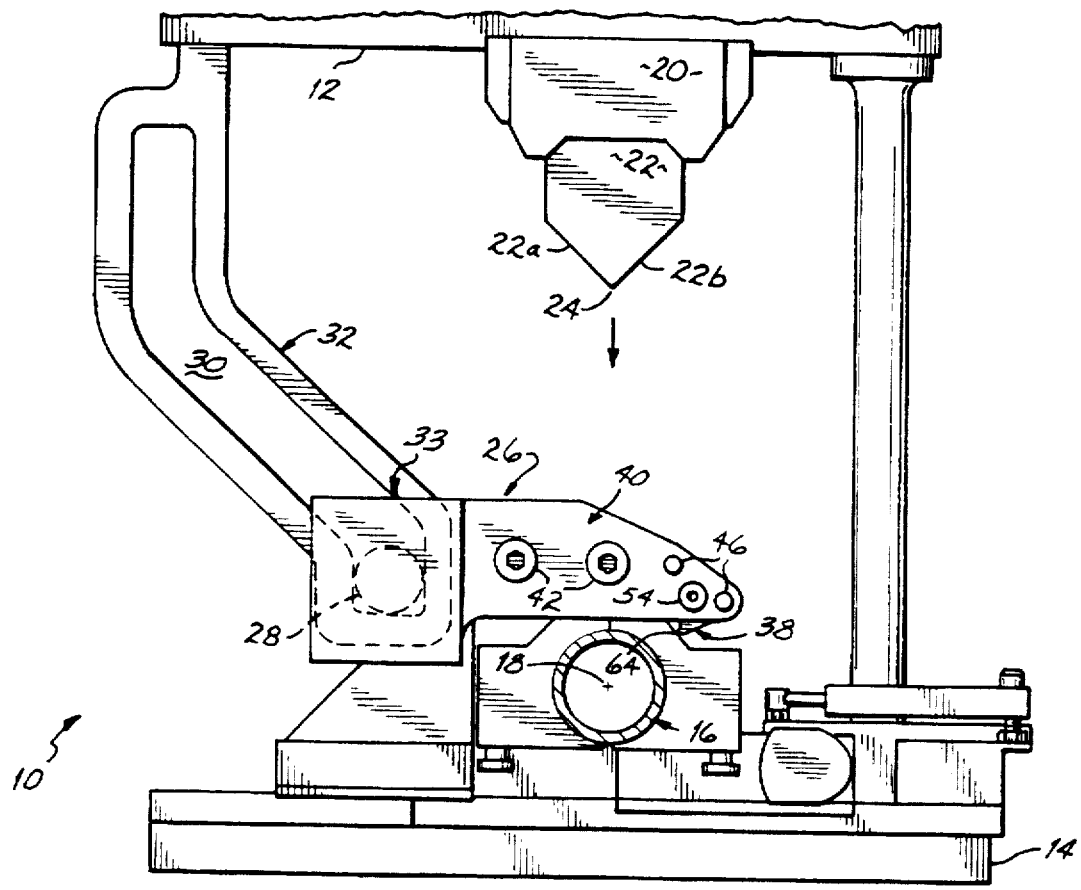
FIG. 1 is a simplified front elevational view of the tube cutting machine of the present invention prior to the beginning of the severing cycle with the notching apparatus at its beginning position.
Figure 2:
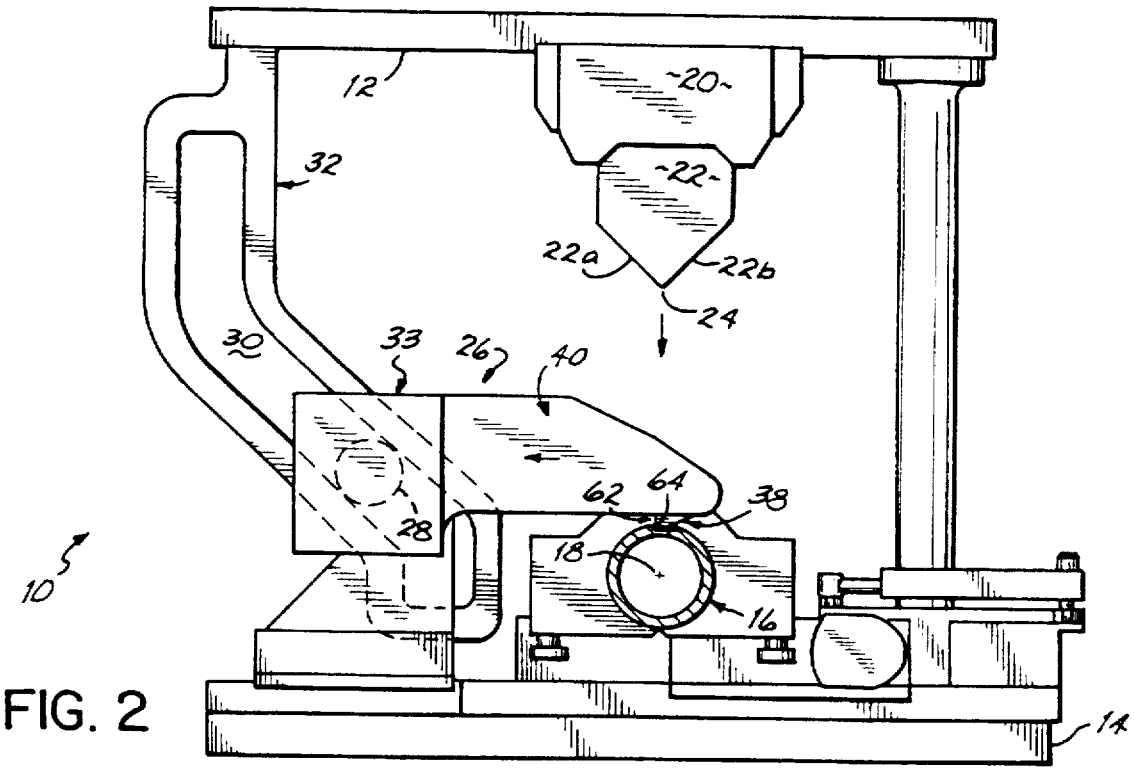
FIG. 2 is a simplified front elevational view of the tube cutting apparatus of FIG. 1 with the notching apparatus engaged with the top of the tube and the severing cycle partially completed.

Referring to the drawings, and particularly to FIGS. 1–3, there is illustrated an apparatus for cutting tubing known in the industry as a tube cut-off die set 10. The machine or apparatus comprises an upper platen 12 and a lower platen assembly 14. A press or the like drives the upper platen 14 in a vertical direction so that the upper platen 14 reciprocates upwardly and downwardly. The guide pins and bushings which are typically employed to direct and stabilize the reciprocal motion of the machine 10 have been eliminated from FIGS. 1–3 for purposes of simplicity but are well understood by those skilled in the art. For an illustration of such an apparatus, reference may be taken to U.S. Pat. No. 4,109,555 which is herein incorporated by reference.

A tube 16 having a longitudinal axis 18 is secured to the lower platen assembly by a conventional tube clamping apparatus such as that disclosed in U.S. Pat. No. 4,646,601. Details of the clamping apparatus are more fully described in U.S. Pat. No. 4,294,147; however, any other means may be utilized to secure the tube in place on the lower platen assembly so that the tube may be severed. Tubing having different diameters, different wall thicknesses, made from different materials including alloys and having various cross-sectional configurations may be used in accordance with the present invention. In this application, the words "tube" and "tubing" are to be given broad scope and not intended to be limiting. Upper platen 12 carries a severing or vertical blade holder 20 which in turn carries a severing blade 22 having leading edges 22a and 22b which intersect to form a piercing point 24. The travel of the severing blade 22 is at right angles to the longitudinal axis 18 of the tube 16 and the width of the severing blade 22 is such that the entire tube 16 is severed as the blade passes through a plane generally perpendicular to the tube axis in one swift movement. Many different apparatus may be used to secure the severing blade to the upper platen assembly. Examples of such apparatus are disclosed in U.S. Pat. Nos. 5,231,908; 4,055,100; 4,993,297; and 4,964,327. In addition to these different types of mechanisms used to secure the severing blade to the upper platen assembly, any other mechanism which functions in the same capacity may alternatively be used.

The tube cutting machine further comprises a notching apparatus 26 which is slidably mounted on lower platen assembly 14 and which further comprises a cam follower 28 which operates within an internal track 30 of a mechanical cam 32 which depends from the upper platen 12. The notching apparatus 26 further includes a notching arm 33 which extends outwardly and terminates in a notching blade holder 36 (see FIG. 4). The shape of the track 30 is such that the notching blade holder 36 lies in and across the path of the severing blade 22 when the die set is fully open (see FIG. 1) and is pulled or drawn across the vertical path of severing blade 20 as the die closes, i.e. as the upper platen 12 descends toward the lower platen assembly 14 due to actuation of the press.

The tube cutting machine of the present invention goes through a complete cycle of both notching and severing a tube before the cycle repeats itself. The complete cycle is illustrated in FIGS. 1–3 with FIG. 1 illustrating the starting point of the cycle. At its starting point, the tube cutting machine is at its most extended position with the upper platen raised to its highest point. Cam follower 28 is located at the very bottom of the internal track 30 of cam 32. In this position the notching apparatus 26 is extended across the tube 16 and at its extreme rightmost position as seen in FIG. 1. As the upper platen 12 is driven downwardly in a continuous stroke, the cam follower 28 moving inside internal track 30 of the cam 32 causes the notching apparatus 26 to move to the left due to the shape of the cam 32. As seen in FIG. 2, the notching blade holder 36 reaches a point directly over the upper wall of the tube 16 at which point the notching blade notches the upper edge of the tube 16.

As the upper platen carrying with it the severing blade holder 20 and severing blade 22 continues to move downward, the notching apparatus 26 continues to move left until the point illustrated in FIG. 3 in which the notching apparatus 26 is at its furthest most left position and the severing blade 22 is directly above the tube 16. As can be seen in FIG. 3, the upper platen 12 would move downward from the position of FIG. 3 and sever the tube 16 in the vertical plane of the notch caused by the notching blade holder 36 being pulled from right to left across the tube 16. When the severing blade 22 contacts the notch newly created in the tube, the notching apparatus 26 is all the way to the left and out of the way of the path of the severing blade 22. Once the tube 16 has been severed, the driving mechanism causes the upper platen 12 to move back upward to its starting position of FIG. 1 and one complete cycle has thus been completed. If another tube is desired to be severed, the new tube is clamped to the lower platen assembly and the process is repeated.

FIG. 4 illustrates the details of the notching apparatus 26. The notching apparatus 26 comprises a notching arm 33, notching blade holder 36, a notching blade 38, a clamping plate 40 and a plurality of fasteners 42. The notching arm 33 may be connected any number of ways to the cam follower 28. One of these ways is disclosed in U.S. Pat. No. 5,003,852 but other ways of interconnecting the notching apparatus to the cam follower may be utilized as well in accordance with the present invention. Two fasteners 44 secure the notching arm 33 to the cam follower and parts associated with the cam follower.

Notching blade holder 36 has a longitudinal dimension in a direction generally transverse to the direction of movement of the severing blade 22. Two pins 46 extend outwardly from the notching blade holder 36 and are spaced apart from one another. The clamping plate 40 has generally the same design as the notching blade holder 36 and has a plurality of holes therethrough. Two of the holes 48 are of a diameter so as to receive the two pins 46 extending outwardly from the notching blade holder 36. The clamping plate 40 has two additional holes of a larger diameter than holes 48 therethrough through which two fasteners 42 pass in order to secure the clamping plate 40 to the notching blade holder 36. One additional hole 52 exists through the clamping plate 40 and allows passage of a smaller fastener 54 through the clamping plate 40 and a notching blade 38 to be secured into a threaded hole 56 in the notching blade holder 36.

Notching blade 38 has one centrally located hole 58 therein through which fastener 54 passes before being screwed into hole 56 in the notching blade holder 36. As illustrated in FIGS. 4 and 5, notching blade 38 comprises a metal plate of uniform thickness and has an irregularly shaped peripheral edge 60. The peripheral edge 60 has three equidistantly spaced hook or J-shaped relief recesses 62 formed therein. Each recess 62 has a cutting edge 64 along the inside thereof and more particularly at the end of the "J" or hook. Each recess 62 comprises a relatively straight portion 66 and an arcuate portion 68, the cutting edge 64 being at the end of the arcuate portion 68. Only one of the three cutting edges 64 is used at a time. Two of the recesses 62 are adapted to receive pins 46. The engagement of the pins 46 with the recesses 62 secure the notching blade 38 against movement and prevents its rotation.

An important and unique feature of the notching blade 38 is the provision of a substantial relief recess 62 functionally in front of each of the cutting edges 64 in order to (1) provide a volume for the slug or chip of metal removed from the tube walls during the notching functions but also to (2) function as a locating surface for the pins 46 which prevent movement of the blade during the cutting operation. Each of the recesses 62 extends well into the body of the notching blade 38 to provide substantial clearance for the material of the tube wall as it is peeled or cut from the tube by the cutting edges. The thickness of the notching blade 38 may be slightly greater than that of the severing or guillotine blade 22 in order to reduce frictional drag on the severing blade 22 as it penetrates the tube 16.

The three separate cutting edges 64 of the notching blade 38 may be changed by simply withdrawing the fasteners 42 and 54 and removing the clamping plate 40 and then rotating the notching blade 38 through an angle of 120°. Thus, a new cutting edge 64 of the notching blade 38 is exposed and may be used for notching purposes. When this cutting edge dulls due to repeated use, the third cutting edge 64 of the notching blade 38 may be used by repeating the same process. When the third cutting edge is worn out, the notching blade 38 may then be replaced. A cutting or notching blade with three equally effective cutting edges or surfaces prolongs the life of the notching blade and thus reduces the cost of new blades and the time required to replace the notching blade.

It will be understood and appreciated by those skilled in the art that various changes and modifications to this invention may be made without departing from the spirit and scope of the invention. Therefore, I do not intend to be limited except by the following claims.

I claim:

1. A tube cutting machine comprising:

a lower platen assembly including means to secure a tube in a position to be severed;

an upper platen assembly having a severing blade attached to said upper platen assembly, said severing blade being movable with said upper platen assembly toward said lower platen assembly to sever said tube;

a notching apparatus including an arm and means interconnecting said arm with the upper platen assembly to cause said arm to move laterally across said tube transverse to the direction of movement of said severing blade as said upper platen assembly descends toward said lower platen assembly;

a notching blade carried by said arm at an extremity thereof for cutting a notch in said tube in alignment with the path of travel of the descending severing blade, said notch being to reduce the tendency of the severance to dimple the tube, the improvement comprising:

a notching blade holder at said extremity of said arm for holding said notching blade securely in place, a clamping plate and at least one fastener, said at least one fastener securing said clamping plate to said notching blade holder and said notching blade between said notching blade holder and said clamping plate, said notching blade holder having at least one pin protruding outwardly from said notching blade holder, said clamping plate having at least one hole therethrough for the reception of said at least one pin, said notching blade having an outer edge having at least one recess therein, said at least one recess being adapted to receive said at least one pin in order to prevent rotation of said notching blade.

2. The tube cutting machine of claim 1 wherein said at least one fastener is a screw.

3. The tube cutting machine of claim 1 wherein one of said fasteners passes through a hole in said notching blade.

4. The tube cutting machine of claim 1 wherein said notching blade has three cutting surfaces.

5. A tube cutting apparatus comprising:

a lower platen assembly including means to secure a tube in a position to be severed;

an upper platen assembly having a severing blade attached to said upper platen assembly, said severing blade being movable with said upper platen assembly toward said lower platen assembly to sever said tube;

a notching apparatus including an arm and means interconnecting said arm with the upper platen assembly to cause said arm to move laterally across said tube transverse to the direction of movement of said severing blade as said upper platen assembly descends toward said lower platen assembly;

a notching blade carried by said arm at an extremity thereof for cutting a notch in said tube in alignment with the path of travel of the descending severing blade, said notch being to reduce the tendency of the severance to dimple the tube, the improvement comprising:

a notching blade holder at said extremity of said arm for holding said notching blade securely in place, a clamping plate fixed to said notching blade holder securing a notching blade therebetween, said notching blade having multiple cutting edges and being held in any one of a plurality of fixed positions by at least one pin protruding outwardly from said notching blade holder and through said clamping plate.

6. The tube cutting apparatus of claim 5, said at least one pin abutting against a peripheral edge of said notching blade.

7. The tube cutting apparatus of claim 5 wherein said notching blade has a peripheral edge having at least one recess therein, said at least one recess being adapted to receive said at least one pin in order to prevent rotation of said notching blade.

8. An apparatus for securing a notching blade to the end of a notching arm for notching a tube comprising:

a notching blade holder having at least one pin protruding outwardly from said notching blade holder, a clamping plate, said clamping plate having at least one hole therethrough, at least one fastener securing said clamping plate to said notching blade holder, a notching blade having three cutting edges along a peripheral edge of said notching blade, said peripheral edge having three recesses, said notching blade being sandwiched between said notching blade holder and said clamping plate, said at least one pin passing through at least one of said recesses, preventing said notching blade from rotating while said blade notches a tube.

9. The apparatus of claim 8 wherein two pins pass through two recesses of said peripheral edge of said notching blade.

10. The apparatus of claim 8 wherein one of said fasteners passes through said notching blade.

11. A notching blade assembly comprising:

a notching blade holder having a longitudinal dimension and two pins extending outwardly in a direction generally perpendicular to said longitudinal dimension, a clamping plate having a plurality of holes therethrough, said clamping plate having a cut out portion, a notching blade having an irregularly shaped peripheral edge, said peripheral edge having at least one cutting surface and three recesses, a plurality of threaded fasteners securing said clamping plate to said notching blade holder, one of said fasteners passing through said notching blade and securing said notching blade in said cutout portion of said clamping plate, two of said recesses receiving said pins in order to better secure said notching blade.

12. The notching blade assembly of claim 11 wherein said notching blade has three cutting surfaces.

13. The notching blade assembly of claim 11 wherein said pins pass through holes in said clamping plate.

14. A notching blade for use in a tube cutting machine comprising a metal plate of a uniform thickness having a centrally located hole therethrough and peripheral edge having a plurality of recesses extending from said peripheral edge toward said hole.

15. The notching blade of claim 14 wherein a cutting surface comprises a portion of each recess.

16. The notching blade of claim 15 wherein each recess comprises a relatively straight portion and an arcuate portion, the cutting surface being at the end of the arcuate portion.

* * * * *